United States Patent
Abe et al.

(10) Patent No.: US 10,328,930 B2
(45) Date of Patent: Jun. 25, 2019

(54) HYBRID VEHICLE

(71) Applicant: TOYOTA JIDOSHA KABUSHIKI KAISHA, Toyota-shi, Aichi-ken (JP)

(72) Inventors: Shizuo Abe, Toyota (JP); Shinji Ichikawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 120 days.

(21) Appl. No.: 15/468,364

(22) Filed: Mar. 24, 2017

(65) Prior Publication Data

US 2017/0282906 A1 Oct. 5, 2017

(30) Foreign Application Priority Data

Mar. 30, 2016 (JP) ................. 2016-069246

(51) Int. Cl.
*B60W 20/40* (2016.01)
*B60W 20/13* (2016.01)
(Continued)

(52) U.S. Cl.
CPC ............... *B60W 20/40* (2013.01); *B60K 6/28* (2013.01); *B60K 6/46* (2013.01); *B60L 11/1822* (2013.01); *B60W 20/13* (2016.01); *B60W 20/15* (2016.01); *B60W 20/16* (2016.01); *B60W 50/12* (2013.01); *B60W 50/14* (2013.01); *B67D 7/04* (2013.01); *B67D 7/08* (2013.01); *B60K 6/20* (2013.01); *B60K 6/445* (2013.01); *B60L 2260/26* (2013.01); *B60L 2270/12* (2013.01); *B60W 20/00* (2013.01); *B60W 40/09* (2013.01); *B60W 2050/146* (2013.01); *B60W 2510/244* (2013.01); *B60W 2710/24* (2013.01); *B60Y 2200/92* (2013.01); *B60Y 2300/188* (2013.01);
(Continued)

(58) Field of Classification Search
None
See application file for complete search history.

(56) References Cited

U.S. PATENT DOCUMENTS 8,812,224 B1 * 8/2014 Heitmann ............. G01C 22/00
  701/123
2012/0116620 A1 * 5/2012 Wang ..................... B60K 35/00
  701/22

(Continued)

FOREIGN PATENT DOCUMENTS

JP    8-19114        1/1996
JP    09-098502 A    4/1997
JP    2013-177042 A  9/2013

*Primary Examiner* — Rami Khatib
(74) *Attorney, Agent, or Firm* — Finnegan, Henderson, Farabow, Garrett & Dunner, LLP

(57) ABSTRACT

A cruising distance coefficient is set that is smaller than a value of 1 and that becomes smaller as a use index indicating a degree of use of external charging gets smaller, and a cruising distance is calculated by multiplying a fuel quantity by the set cruising distance coefficient and a fuel consumption coefficient. Then, a display cruising distance is calculated by subtracting from the cruising distance a value obtained by subtracting a set-time travel distance Lset, obtained when the cruising distance is calculated, from a travel distance from a travel distance meter, and the calculated display cruising distance is displayed on a display device in front of a driver's seat.

10 Claims, 13 Drawing Sheets

(51) Int. Cl.
*B60W 20/16* (2016.01)
*B60W 50/14* (2012.01)
*B60K 6/28* (2007.10)
*B60K 6/46* (2007.10)
*B60L 11/18* (2006.01)
*B67D 7/04* (2010.01)
*B67D 7/08* (2010.01)
*B60W 50/12* (2012.01)
*B60W 20/15* (2016.01)
*B60K 6/20* (2007.10)
*B60K 6/445* (2007.10)
*B60W 20/00* (2016.01)
*B60W 40/09* (2012.01)

(52) U.S. Cl.
CPC ........ *Y02T 10/6239* (2013.01); *Y02T 10/6269* (2013.01); *Y02T 10/84* (2013.01); *Y10S 903/903* (2013.01)

(56) References Cited

U.S. PATENT DOCUMENTS

| | | | |
|---|---|---|---|
| 2013/0073113 A1* | 3/2013 | Wang | B60K 6/445 701/1 |
| 2013/0151056 A1* | 6/2013 | Nakano | B60K 6/46 701/22 |
| 2013/0226379 A1 | 8/2013 | Hirai | |
| 2014/0142836 A1* | 5/2014 | Yabuta | B60W 10/06 701/123 |

\* cited by examiner

|  | USE INDEX IDX IS LARGE | USE INDEX IDX IS SMALL |
|---|---|---|
| CRUISING DISTANCE | 600km | 120km |
| EV-TRAVELABLE DISTANCE | 20km | 20km |

HYBRID VEHICLE

INCORPORATION BY REFERENCE

The disclosure of Japanese Patent Application No. 2016-069246 filed on Mar. 30, 2016 including the specification, drawings and abstract is incorporated herein by reference in its entirety.

BACKGROUND

1. Technical Field

The disclosure relates to a hybrid vehicle and more specifically relates to a hybrid vehicle that is configured such that charging of a battery and refueling of a fuel tank are carried out.

2. Description of Related Art

Conventionally, as this type of hybrid vehicle, there has been proposed one in which at least one of the output of an electric motor and the output of an internal combustion engine is limited when the change in parameter that depends on the quantity of fuel use by the internal combustion engine after external charging of a battery has reached a predetermined value (see, e.g. Japanese Patent Application Publication No. 8-19114 (JP 8-19114 A)). With this hybrid vehicle, a driver is urged to external charging of the battery by the limitation of at least one of the output of the electric motor and the output of the internal combustion engine when the change in parameter has reached the predetermined value, thereby facilitating the travel of the vehicle not relying on the internal combustion engine. Consequently, the effect of suppressing air pollution, which is the primary purpose of an electric vehicle, can be sufficiently obtained while leaving a margin such that the vehicle can travel by the internal combustion engine in an emergency.

SUMMARY

With the hybrid vehicle described above, however, only by limiting at least one of the output of the electric motor and the output of the internal combustion engine, there are those instances where the effect of urging the use of external charging is insufficient. For example, for a driver who always drives the vehicle to travel with relatively low power, the output limitation of the electric motor or the internal combustion engine has no meaning at all.

A hybrid vehicle of the disclosure facilitates the use of external charging.

A hybrid vehicle according to an aspect of the disclosure includes: an engine; a fuel tank configured to supply fuel to the engine; a motor; a battery configured to supply electric power to the motor; a charger configured to carry out external charging that charges the battery using an external power source; and an electronic control unit configured to adjust a cruising distance, the cruising distance being a distance that the hybrid vehicle can travel using the fuel, such that the cruising distance when a use index indicating a degree of use of the external charging in a predetermined time period is small is smaller than the cruising distance when the use index is large.

In the hybrid vehicle of the disclosure, when the use index indicating the degree of use of the external charging is small, the cruising distance that can be traveled using the fuel is adjusted to be small compared to when the use index is large. That is, by reducing the cruising distance that can be traveled using the fuel, it is intended to urge a driver to use the external charging. With this configuration, it is possible to facilitate the use of the external charging. Herein, as a "predetermined time period", it is possible to use a time period that is determined in advance in terms of time, such as one month or two months, a time period that is determined in advance in terms of occasion, such as during 20 trips or during 30 trips, or the like.

A "use index" indicates a degree of use of external charging in a predetermined time period, and in this specification, use is made of a use index that indicates a relationship of better use of external charging as the use index gets greater. For example, it is possible to use one of (1) to (14) given below directly as a use index, or it is possible to use as a use index a value that is calculated based on one or a plurality of (1) to (14). (1) Ratio of Number of Times of Charging to Number of Trips (Number of Times of Charging/Number of Trips); (2) Ratio of Total Time for which Charger is connected to External Power Source to Total Time for which Vehicle is stopped with System off (Total Charger Connecting Time/Total Vehicle Stop Time); (3) Ratio of Total Distance of EV Travel to Total Distance of HV Travel (Total EV-Travel Distance/Total HV-Travel Distance); (4) Ratio of Total Time of EV Travel to Total Time of HV Travel (Total EV-Travel Time/Total HV-Travel Time); (5) Ratio of Total Distance of EV Travel to Total Travel Distance (Total EV-Travel Distance/Total Travel Distance); (6) Ratio of Total Time of EV Travel to Total Travel Time (Total EV-Travel Time/Total Travel Time); (7) Ratio of Total Charging Amount of Charging of Battery by Charger to Total Refueled Quantity to Fuel Tank (Total Charging Amount/Total Refueled Quantity); (8) Ratio of Integrated Value of Energy charged to Battery by Electric Power from External Power Source to Integrated Value of Energy consumed by Travel (Integrated Externally-Charged Energy Value/Integrated Travel-Consumed Energy Value); (9) Ratio of Integrated Value of Energy consumed by EV Travel to Integrated Value of Energy consumed by HV travel (integrated EV-Travel Energy Value/Integrated HV-Travel Energy Value); (10) Total Time for which Charger is connected to External Power Source (Total Charger Connecting Time); (11) Total Charging Amount of Charging of Battery by Charger; (12) Ratio of Traveled Total Travel Distance to Total Discharge Amount of Carbon Dioxide (Total Travel Distance/Total Carbon Dioxide Discharge Amount); (13) Ratio of, to Number of Charging Chances in State where Vehicle can be externally charged (Number of Chances), Number of Times of carrying out External Charging in that State (Number of Times of Charging in Chance) (Number of Times of Charging in Chance/Number of Chances); (14) Inverse Number of Quantity of Fuel Use by Internal Combustion Engine after External Charging (1/Quantity of Fuel Use after External Charging).

The hybrid vehicle may include a display device. The electronic control unit may be configured to control the display device such that the display device displays a distance that is smaller than a travelable distance calculated from a fuel quantity in the fuel tank, as the cruising distance. With this configuration, it is possible to urge the driver to use the external charging by notifying the driver of, as the cruising distance, the distance that is smaller than the travelable distance calculated from the fuel quantity in the fuel tank. The electronic control unit may be configured to calculate the cruising distance by multiplying the travelable distance, calculated from the fuel quantity in the fuel tank, by a coefficient that becomes smaller as the use index gets smaller. With this configuration, since the shorter cruising distance is displayed as the use index gets smaller, it is possible to strongly urge the driver to use the external charging.

The electronic control unit may be configured to limit fuel supply from the fuel tank to the engine when the cruising distance has been traveled. With this configuration, it is possible to strongly urge the driver to use the external charging.

The electronic control unit may be configured to limit refueling to the fuel tank. With this configuration, since the cruising distance decreases due to the limitation of the refueling, it is possible to strongly urge the driver to use the external charging.

The electronic control unit may be configured to close a refueling port of the fuel tank. With this configuration, since the refueling is not allowed, the cruising distance decreases, and therefore, the external charging is needed for travel, so that it is possible to strongly urge the driver to use the external charging.

The electronic control unit may be configured to cause a refueling device to determine that the fuel tank is full of fuel when the fuel quantity in the fuel tank is less than 100%. With this configuration, since the refueling device determines that the fuel tank is full before the fuel tank becomes full, the cruising distance decreases due to the fuel tank being unable to be full, so that it is possible to strongly urge the driver to use the external charging.

The fuel tank may be configured such that the capacity of the fuel tank is variable, and the electronic control unit may be configured to reduce the capacity of the fuel tank. With this configuration, since the cruising distance decreases by reducing the capacity of the fuel tank to make a refueling quantity small, it is possible to strongly urge the driver to use the external charging.

The electronic control unit may be configured to transmit, to a refueling device configured to carry out refueling in response to receipt of a required refueling quantity from the hybrid vehicle, a refueling quantity that is smaller than a refuelable quantity calculated from a fuel quantity in the fuel tank, as the required refueling quantity. Assuming, as a refueling device that refuels a vehicle, the presence of a device configured to carry out refueling in response to receipt of a required refueling quantity from the vehicle, a refueling quantity that is smaller than a refuelable quantity calculated from a fuel quantity in the fuel tank is transmitted as the required refueling quantity to such a refueling device. Then, the refueling device stops the refueling when the refueled quantity has reached the required refueling quantity. With this configuration, since the cruising distance decreases by reducing the refueling quantity to the fuel tank, it is possible to strongly urge the driver to use the external charging.

The electronic control unit may be configured to slow down a refueling speed by causing an opening area of a portion of a refueling pipe to be smaller than a normal area. When the refueling speed is slowed down, it takes time to refuel the fuel tank, so that it is possible to strongly urge the driver to use the external charging.

The electronic control unit may be configured to transmit a signal to a refueling device configured to be communicable and to be able to adjust a refueling speed such that the refueling device carries out refueling at a refueling speed slower than a normal refueling speed. Assuming, as a refueling device that refuels a vehicle, the presence of a device configured to be communicable and to be able to adjust the refueling speed, the signal is transmitted to the refueling device so as to carry out the refueling at the refueling speed slower than the normal refueling speed. Then, the refueling device carries out the refueling at the refueling speed slower than the normal refueling speed. With this configuration, since it takes time to refuel the fuel tank, it is possible to strongly urge the driver to use the external charging.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
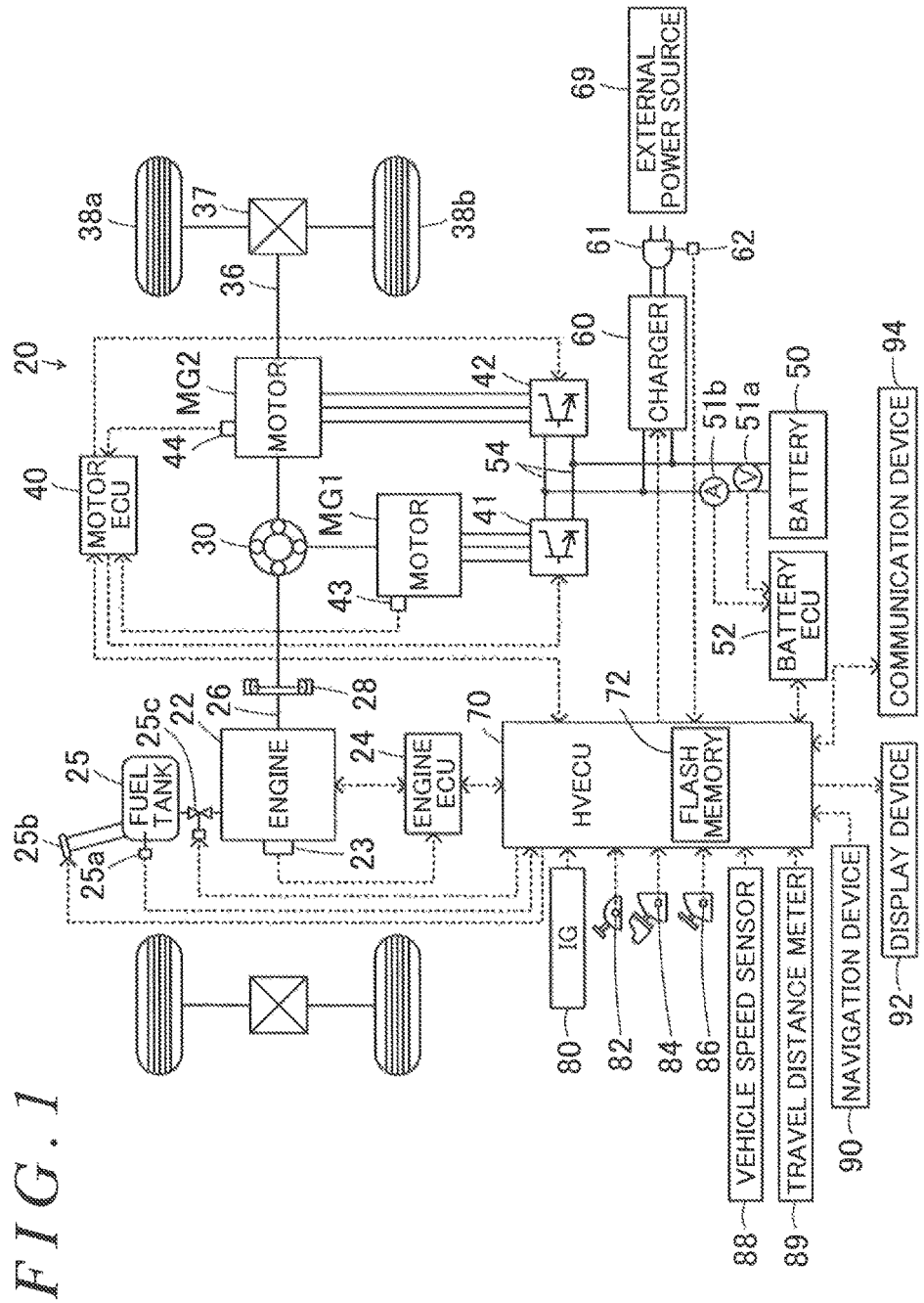
FIG. 1 is a configuration diagram schematically showing the configuration of a hybrid vehicle according to an embodiment.

Now, a mode for carrying out the embodiment will be described with reference to an embodiment. FIG. 1 is a configuration diagram schematically showing the configuration of a hybrid vehicle 20 according to the embodiment. As shown in FIG. 1, the hybrid vehicle 20 of the embodiment includes an engine 22, a planetary gear 30, motors MG1 and MG2, inverters 41 and 42, a battery 50, a charger 60, a navigation device 90, a display device 92, a communication device 94, and a hybrid electronic control unit (hereinafter referred to as an "HVECU") 70.

The engine 22 is configured as an internal combustion engine that uses fuel such as gasoline or diesel fuel from a fuel tank 25 to output power. The operation of the engine 22 is controlled by an engine electronic control unit (hereinafter referred to as an "engine ECU") 24.

Although not shown, the engine ECU 24 is configured as a microprocessor including a CPU as its main component and, in addition to the CPU, includes a ROM that stores processing programs, a RAM that temporarily stores data, input and output ports, and a communication port. Signals from various sensors that are necessary for controlling the operation of the engine 22, such as, for example, a crank angle θcr from a crank position sensor 23 that detects a rotational position of a crankshaft 26 of the engine 22, are input to the engine ECU 24 via the input port. Various control signals for controlling the operation of the engine 22 are output from the engine ECU 24 via the output port. The engine ECU 24 is connected to the HVECU 70 via the communication port. The engine ECU 24 calculates a rotational speed Ne of the engine 22 based on the crank angle θcr from the crank position sensor 23.

The planetary gear 30 is configured as a single-pinion type planetary gear mechanism. A rotor of the motor MG1 is connected to a sun gear of the planetary gear 30. A drive shaft 36 coupled to drive wheels 38a and 38b via a differential gear 37 is connected to a ring gear of the planetary gear 30. The crankshaft 26 of the engine 22 is connected to a carrier of the planetary gear 30 via a damper 28.

The motor MG1 is configured as, for example, a synchronous generator motor, and as described above, the rotor of the motor MG1 is connected to the sun gear of the planetary gear 30. The motor MG2 is configured as, for example, a synchronous generator motor, and a rotor of the motor MG2 is connected to the drive shaft 36. The inverters 41 and 42 are connected to the battery 50 via an electric power line 54. The motors MG1 and MG2 are rotationally driven by the inverters 41 and 42, respectively, when a plurality of switching elements (not shown) of the inverters 41 and 42 are switching-controlled by, a motor electronic control unit (hereinafter referred to as a "motor ECU") 40.

Although not shown, the motor ECU 40 is configured as a microprocessor including a CPU as its main component and, in addition to the CPU, includes a ROM that stores processing programs, a RAM that temporarily stores data, input and output ports, and a communication port. Signals from various sensors that are necessary for drivingly controlling the motors MG1 and MG2, such as, for example, rotational positions θm1 and θm2 from rotational position detection sensors 43 and 44 that respectively detect rotational positions of the rotors of the motors MG1 and MG2, are input to the motor ECU 40 via the input port. Switching control signals for the switching elements (not shown) of the inverters 41 and 42 and so on are output from the motor ECU 40 via the output port. The motor ECU 40 is connected to the HVECU 70 via the communication port. The motor ECU 40 calculates rotational speeds Nm1 and Nm2 of the motors MG1 and MG2 based on the rotational positions θm1 and θm2 of the rotors of the motors MG1 and MG2 from the rotational position detection sensors 43 and 44.

The battery 50 is configured as, for example, a lithium-ion secondary battery or a nickel-hydrogen secondary battery. As described above, the battery 50 is connected to the inverters 41 and 42 via the electric power line 54. The battery 50 is managed by a battery electronic control unit (hereinafter referred to as a "battery ECU") 52.

Although not shown, the battery ECU 52 is configured as a microprocessor including a CPU as its main component and, in addition to the CPU, includes a ROM that stores processing programs, a RAM that temporarily stores data, input and output ports, and a communication port. Signals from various sensors that are necessary for managing the battery 50, such as, for example, a battery voltage Vb from a voltage sensor 51a disposed between terminals of the battery 50 and a battery current 1b from a current sensor 51b attached to the output terminal of the battery 50, are input to the battery ECU 52 via the input port. The battery ECU 52 is connected to the HVECU 70 via the communication port. The battery ECU 52 calculates a state of charge SOC based on an integrated value of the battery current Ib from the current sensor 51b. The state of charge SOC is a ratio of the capacity of electric power, that can be discharged from the battery 50, to the full capacity of the battery 50.

The charger 60 is connected to the electric power line 54 and configured such that when a power plug 61 is connected to an external power source 69 such as a household power source or an industrial power source at a battery charging point such as at home or in a battery charging station, it is possible to carry out external charging that charges the battery 50 using electric power from the external power source 69.

The navigation device 90 includes a body incorporating a control unit having a storage medium such as a hard disk that stores map information and so on, input and output ports, a communication port, and so on, a GPS antenna that receives information on the current position of the vehicle, and a touch-panel display that displays various information such as information on the current position of the vehicle and a travel route to a destination and that allows an operator to input various instructions. Herein, as the map information, service information (e.g. sightseeing information, parking lots, battery charging stations, etc.), road information per travel section determined in advance (e.g. between traffic lights, between intersections, etc.), and so on are stored in a database. The road information includes distance information, width information, area information (urban area, suburban area), type information (general road, expressway), gradient information, legal speed limit, the number of traffic lights, and so on. A parking lot at home and a desired spot can be point-registered as service information. When a destination is set by the operator, the navigation device 90 searches for a travel route from a current position of the vehicle to the destination based on the map information, the current position of the vehicle, and the destination and outputs the retrieved travel route to the display to perform route guidance. The navigation device 90 also calculates route information in the travel route (e.g. a remaining distance Ln to the destination, a direction Dn of the destination, etc.).

Although not shown, the HVECU 70 is configured as a microprocessor including a CPU as its main component and, in addition to the CPU, includes a ROM that stores processing programs, a RAM that temporarily stores data, a flash memory 72, input and output ports, and a communication port. Signals from various sensors are input to the HVECU 70 via the input port. As the signals that are input to the HVECU 70, there can be cited, for example, an ignition signal from an ignition switch 80, a shift position SP from a shift position sensor 82, an accelerator opening degree Acc from an accelerator pedal position sensor 84, and a brake pedal position BP from a brake pedal position sensor 86. There can further be cited a vehicle speed V from a vehicle speed sensor 88, a travel distance Lpre from a travel distance meter 89, and a fuel quantity Qf from a fuel gauge 25a attached to the fuel tank 25. Further, there can also be cited a connection signal SWC from a connection switch 62 that is attached to the power plug 61 and determines whether or not the power plug 61 is connected to the external power source 69, data from the navigation device 90, and so on. Various control signals are output from the HVECU 70 via the output port. As the control signals that are output from the HVECU 70, there can be cited, for example, a control signal to the charger 60, an opening/closing signal to an electrically-operated refueling lid 25b attached to a refueling port of the fuel tank 25, a drive signal to a fuel supply valve 25c attached to a supply pipe from the fuel tank 25 to the engine 22, a display control signal to the display device 92 attached to an instrument panel in front of a driver's seat, and so on. The HVECU 70 transmits vehicle information to an external system and receives information from the external system via the communication device 94. As described above, the HVECU 70 is connected to the engine ECU 24, the motor ECU 40, and the battery ECU 52 via the communication port. When the fuel tank 25 is refueled, the HVECU 70 calculates a refueled quantity Qin based on a fuel quantity Qf from the fuel gauge 25a.

The hybrid vehicle 20 of the embodiment configured as described above performs hybrid travel (HV travel) or electric travel (EV travel) in a CD (Charge Depleting) mode or a CS (Charge Sustaining) mode. Herein, the CD mode is a mode that gives priority to the EV travel compared to the CS mode. The HV travel is a mode of traveling with the operation of the engine 22. The EV travel is a mode of traveling without the operation of the engine 22.

In the embodiment, when the power plug 61 is connected to the external power source 69 while the vehicle is stopped with the system off (with the system stopped) at a battery charging point such as at home or in a battery charging station, the HVECU 70 controls the charger 60 to charge the battery 50 using electric power from the external power source 69. When the state of charge SOC of the battery 50 is greater than a threshold value Shv1 (e.g. 45%, 50%, or 55%) upon turning on the system (upon starting the system), the vehicle travels in the CD mode until the state of charge SOC of the battery 50 reaches a threshold value Shv2 (e.g. 25%, 30%, or 35%) or less, while, after the state of charge SOC of the battery 50 reaches the threshold value Shv2 or less, the vehicle travels in the CS mode until the system is turned off. On the other hand, when the state of charge SOC of the battery 50 is less than or equal to the threshold value Shv1 upon turning on the system, the vehicle travels in the CS mode until the system is turned off.

Figure 2:
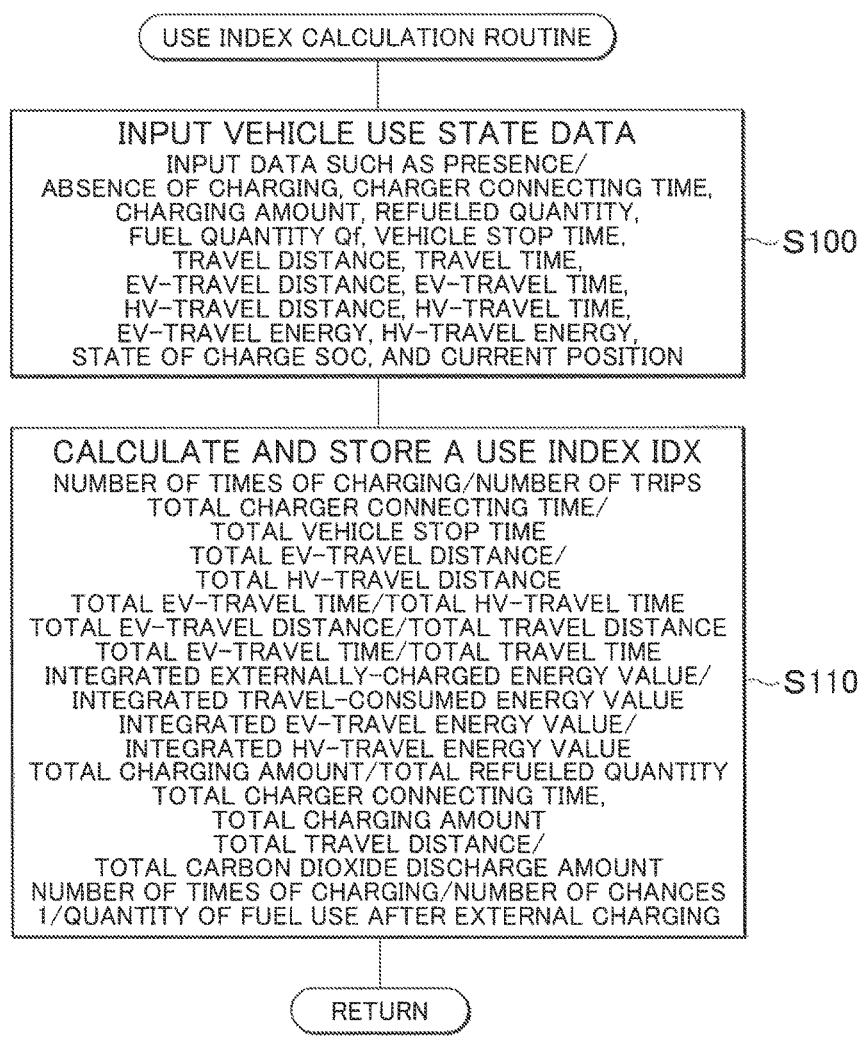
FIG. 2 is a flowchart showing one example of a use index calculation routine that is executed by an HVECU.
Figure 3:
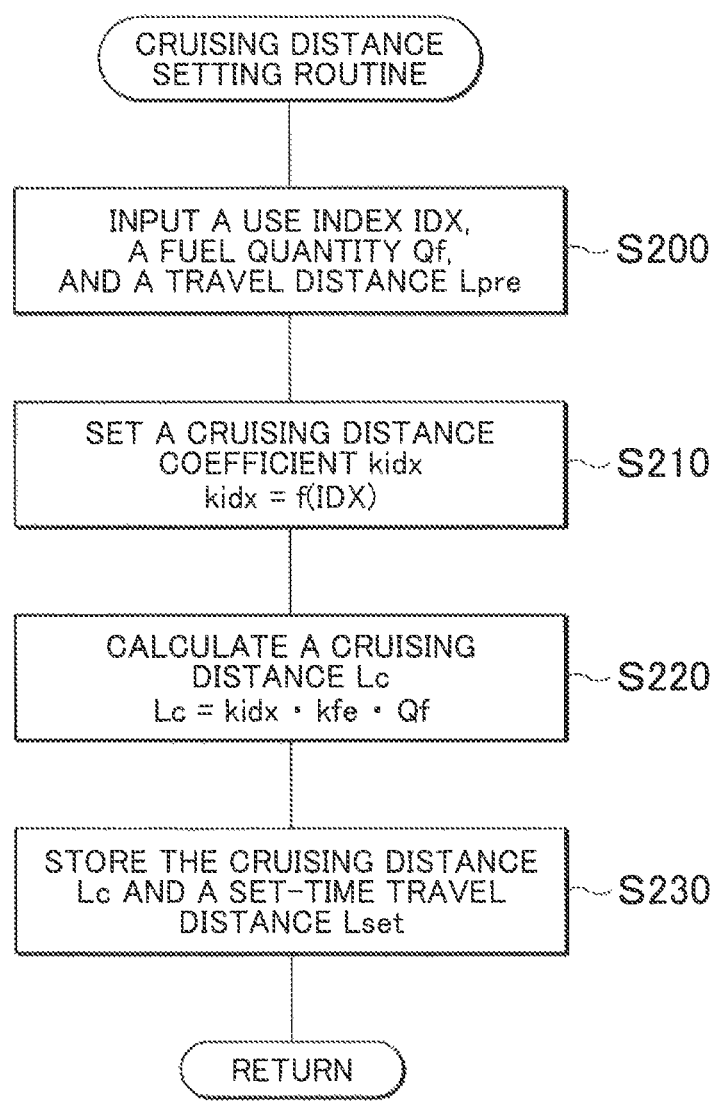
FIG. 3 is a flowchart showing, one example of a cruising distance setting routine that is executed by the HVECU.
Figure 4:
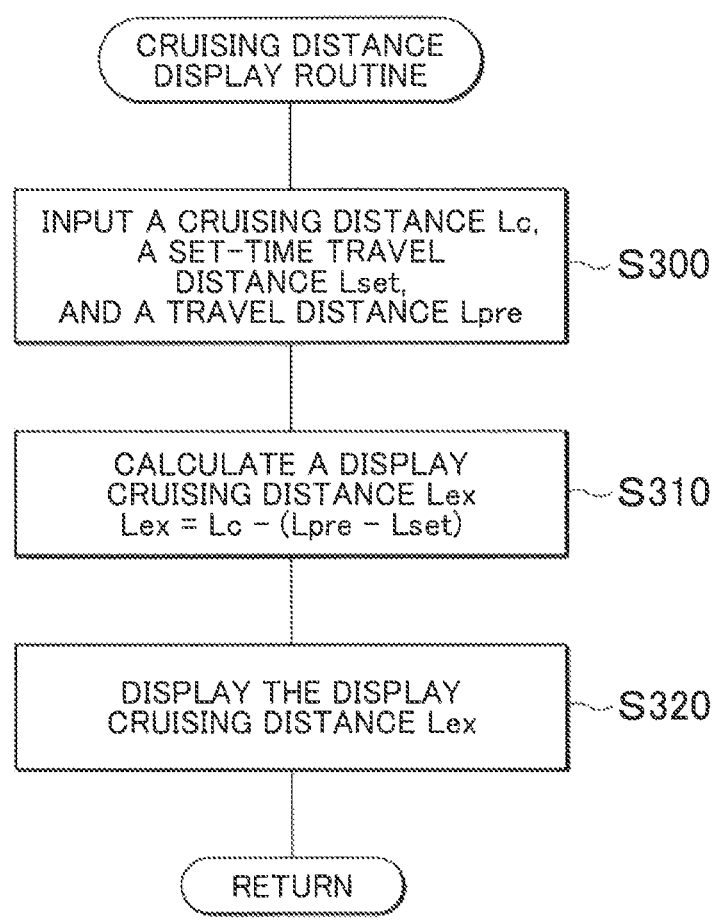
FIG. 4 is a flowchart showing one example of a cruising distance display routine that is executed by the HVECU.
Figure 5:
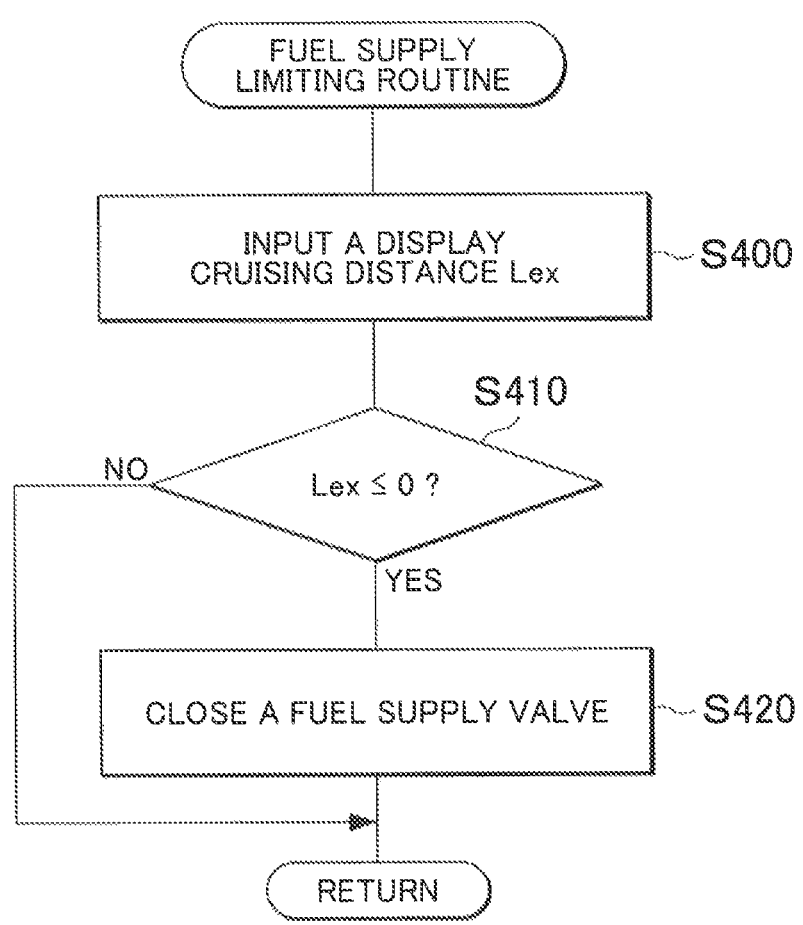
FIG. 5 is a flowchart showing one example of a fuel supply limiting routine that is executed by the HVECU.

Next, a description will be given of the operation of the hybrid vehicle 20 of the embodiment thus configured, particularly the operation of the hybrid vehicle 20 when a use index IDX indicating a degree of use of charging (external charging) of the battery 50 by the charger 60 is small, i.e. when the degree of use of external charging is low. In the hybrid vehicle 20 of the embodiment, when the degree of use of external charging is low, the cruising distance that can be cruised with a fuel quantity Qf stored in the fuel tank 25 is displayed to be smaller, or fuel supply to the engine 22 from the fuel tank 25 is limited when the travel distance has reached the cruising distance, thereby urging a driver to use external charging. FIG. 2 is a flowchart showing one example of a use index calculation routine that is executed by the HVECU 70. FIG. 3 is a flowchart showing one example of a cruising distance setting routine that is executed by the HVECU 70. FIG. 4 is a flowchart showing one example of a cruising distance display routine that is executed by the HVECU 70. FIG. 5 is a flowchart showing one example of a fuel supply limiting routine that is executed by the HVECU 70. Hereinbelow, these routines will be described in order.

The use index calculation routine is executed at a predetermined start timing, such as when the system is turned on (the system is started), when the system is turned off (the system is stopped), when charging of the battery 50 is completed by connecting the power plug 61 to the external power source 69, or when the fuel tank 25 is refueled. Hereinbelow, a description will be given assuming that this routine is executed when the system is turned on (the system is started).

When the use index calculation routine is executed, the HVECU 70 first performs a process of inputting data that reflect vehicle use states and are necessary for calculating a use index IDX in a predetermined time period (step S100). Herein, as a "predetermined time period", it is possible to use a time period that is determined in advance in terms of time, such as one month or two months, a time period that is determined in advance in terms of occasion, such as during 20 trips or during 30 trips, or the like. As "data that reflect vehicle use states", there can be cited, as data from the system-on timing of the last trip to the system-on timing of the current trip, the presence/absence of charging of the battery 50 by the charger 60 (the presence/absence of external charging), a charging time (a charger connecting time) for which the power plug 61 of the charger 60 is connected to the external power source 69, and a charging amount of the battery 50 by the charger 60. There can also be cited a refueled quantity, a fuel quantity Qf, a vehicle stop time from the system-off timing of the last trip to the system-on timing of the current trip, a travel distance in the last trip, and a travel time in the last trip. Further, there can be cited an EV travel distance in the last trip, an EV-travel time in the last trip, an HV-travel distance in the last trip, and an HV travel time in the last trip. Further, there can be cited an energy (an EV-travel energy) consumed by EV travel in the last trip, an energy (an HV-travel energy) consumed by HV travel in the last trip, a state of charge SOC, a current position of the vehicle, and so on.

After the data necessary for calculating the use index IDX are input as described above, the HVECU 70 calculates a use index IDX using the input data and stores the calculated use index IDX in the RAM (not shown) and the flash memory 72 of the HVECU 70 (step S110), and ends this routine. In the embodiment, the use index IDX is calculated as one of (1) to (14) given below or is calculated based on one or a plurality of (1) to (14). The use index IDX is calculated such that the greater the use index IDX, the better the use of charging (external charging) of the battery 50 by the charger 60.

(1) Ratio of Number of Times of Charging to Number of Trips (Number of Times of Charging Number of Trips) The number of times of charging can be obtained by counting based on the presence/absence of external charging in the predetermined time period. The presence/absence of external charging can be detected by determining whether or not the power plug 61 is connected to the external power source 69 based on a connection signal SWC from the connection switch 62, or by determining an increase in the state of charge SOC of the battery 50. The number of trips can be obtained by counting every time the system is turned on in the predetermined time period. (2) Ratio of Total Time for which Charger 60 is connected to External Power Source 69 to Total Time for which Vehicle is stopped with System off (Total Charger Connecting Time/Total Vehicle Stop Time) The total charger connecting time can be obtained by integrating the charging time for which the power plug 61 of the charger 60 is connected to the external power source 69 in the predetermined time period. The total vehicle stop time can be obtained by integrating the vehicle stop time between the trips in the predetermined time period. (3) Ratio of Total Distance of EV Travel to Total Distance of HV Travel (Total EV-Travel Distance/Total HV-Travel Distance) The total EV-travel distance can be obtained by integrating the EV-travel distances in the trips in the predetermined time period. The total HV-travel distance can be obtained by integrating the HV-travel distances in the trips in the predetermined time period.

(4) Ratio of Total Time of EV Travel to Total Time of HV Travel (Total EV-Travel Time/Total HV-Travel Time) The total EV-travel time can be obtained by integrating the EV-travel time in the trips in the predetermined time period. The total HV-travel time can be obtained by integrating the HV-travel time in the trips in the predetermined time period. (5) Ratio of Total Distance of EV Travel to Total Travel Distance (Total EV-Travel Distance/Total Travel Distance) The total travel distance can be obtained by integrating the travel distances in the trips in the predetermined time period. (6) Ratio of Total Time of EV Travel to Total Travel Time (Total EV-Travel Time/Total Travel Time) The total travel time can be obtained by integrating the travel time in the trips in the predetermined time period.

(7) Ratio of Total Charging Amount of Charging of Battery 50 by Charger 60 to Total Refueled Quantity to Fuel Tank 25 (Total Charging Amount/Total Refueled Quantity) The total charging amount can be obtained by integrating the charging amounts by external charging in the predetermined time period. The total refueled quantity can be obtained by integrating the refueled quantities in the predetermined time period. (8) Ratio of Integrated Value of Energy charged to Battery 50 by Electric Power from External Power Source 69 to Integrated Value of Energy consumed by Travel (Integrated Externally-Charged Energy Value/Integrated Travel-Consumed Energy Value) The integrated externally-charged energy value can be obtained by integrating the charging amounts in the predetermined time period. The integrated travel-consumed energy value can be obtained as an integrated value of EV-travel energy and HV-travel energy. The EV-travel energy or the HV-travel energy can be obtained by time-integrating the product of a vehicle weight M and a vehicle speed V ($\int M \cdot V dt$) during EV travel or HV travel. As the vehicle weight M, it is possible to use a value measured by a vehicle weight sensor, a value calculated based on data from a gradient sensor and the torque and acceleration of the motor MG2, or a value determined in advance. (9) Ratio of Integrated Value of Energy consumed by EV Travel to Integrated Value of Energy consumed by HV travel (Integrated EV-Travel Energy Value/Integrated HV-Travel Energy Value) The integrated EV-travel energy value can be obtained by integrating the EV-travel energy. The integrated HV-travel energy value can be obtained by integrating the HV-travel energy.

(10) Total Time for which Charger 60 is connected to External Power Source 69 (Total Charger Connecting Time) The total charger connecting time can be obtained by integrating the time for which the charger 60 is connected to the external power source 69 in the predetermined time period. (11) Total Charging Amount of Charging of Battery 50 by Charger 60 The total charging amount can be obtained by integrating the charging amounts by external charging in the predetermined time period. (12) Ratio of Traveled Total Travel Distance to Total Discharge Amount of Carbon Dioxide (Total Travel Distance/Total Carbon Dioxide Discharge Amount) The total carbon dioxide discharge amount can be calculated as the sum of the product of the total refueled quantity and a fuel coefficient and the product of the total charging amount and an external charging coefficient.

(13) Ratio of, to Number of Charging Chances in State where Vehicle can be externally charged (Number of Chances), Number of Times of carrying out External Charging in that State (Number of Times of Charging in Chance) (Number of Times of Charging in Chance/Number of Chances) The number of chances can be obtained by counting the number of times in which the vehicle was parked in a parking lot at home or in a battery charging station in the predetermined time period. Whether or not the vehicle is parked in the parking lot at home or in the battery charging station can be determined by determining whether or not the current position of the vehicle from the navigation device 90 is the parking lot at home or the battery charging station. The number of times of charging can be obtained by counting the number of times in which the vehicle was parked in the parking lot at home or in the battery charging station and charged in the predetermined time period. (14) Inverse Number of Quantity of Fuel Use by internal Combustion Engine after External Charging (1/Quantity of Fuel Use after External Charging) The quantity of fuel use after external charging can be calculated based on a fuel quantity Qf when the external charging was carried out, a refueled quantity, and a current fuel quantity Qf.

Figures 6, 7:
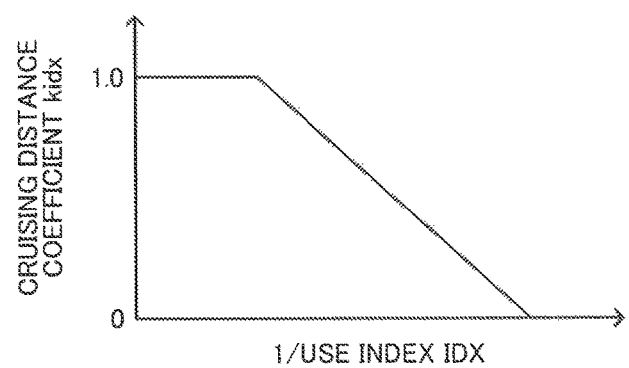
FIG. 6 is an explanatory diagram showing one example of a cruising distance coefficient setting map.
FIG. 7 is an explanatory diagram showing one example of the relationship for the same fuel quantity Qf between the magnitude of a use index IDX and both a cruising distance Lc and an EV-travelable distance that are displayed on a display device.

Next, the cruising distance setting routine of FIG. 3 will be described. This routine is repeatedly executed every predetermined time (e.g. every 10 minutes or every 20 minutes). When the cruising distance setting routine is executed, the HVECU 70 first performs a process of inputting data, such as a use index IDX, a fuel quantity Qf that is detected by the fuel gauge 25*a*, and a travel distance Lpre from the travel distance meter 89, which are necessary for setting a cruising distance Lc (step S200). Then, the HVECU 70 sets a cruising distance coefficient kidx based on the use index IDX (step S210). Herein in the embodiment, the relationship between a use index IDX and a cruising distance coefficient kidx is determined in advance and stored as a cruising distance coefficient setting map, so that when a use index IDX is given, a corresponding cruising distance coefficient kidx is derived from the map and set. FIG. 6 shows one example of the cruising distance coefficient setting map. As shown in FIG. 6, the cruising distance coefficient kidx is set to a value of 1.0 when the use index IDX is greater than or equal to a certain value, and is set to a smaller value when the use index IDX becomes smaller than the certain value. Therefore, in the cruising distance coefficient setting map of the embodiment, when the degree of use of external charging is greater than or equal to the certain value, the value 1.0 is set as the cruising distance coefficient kidx, while when the degree of use of external charging becomes smaller than the certain value, the cruising distance coefficient kidx also becomes smaller than the value 1.0. Then, the HVECU 70 multiplies the fuel quantity Qf by the set cruising distance coefficient kidx and a fuel consumption coefficient kfe to calculate a cruising distance Lc (step S220). Then, the HVECU 70 stores the calculated cruising distance Lc and stores the travel distance Lpre as a set-time travel distance Lset in a predetermined area of the flash memory 72 (step S230), and ends this routine. The fuel consumption coefficient kfe is a travel distance per unit fuel quantity when the vehicle travels while consuming the fuel, and may be determined in advance or may be obtained by calculation of fuel consumption in a certain time period. Therefore, when the degree of use of external charging is greater than or equal to the certain value (the cruising distance coefficient kidx has the value 1.0), the cruising distance Lc is calculated as a value that is obtained by multiplying the fuel quantity Qf by the fuel consumption coefficient kfe, while when the degree of use of external charging is smaller than the certain value (the cruising distance coefficient kidx is smaller than the value 1.0), the cruising distance Lc is calculated as a value that is smaller than the product of the fuel quantity Qf and the fuel consumption coefficient kfe.

Next, the cruising distance display routine of FIG. 4 will be described. This routine is repeatedly executed every predetermined time (e.g. every 10 seconds or every 20 seconds). When the cruising distance display routine is executed, the HVECU 70 first inputs data, such as a cruising distance. Lc, a set-time travel distance Lset, and a travel distance Lpre from the travel distance meter 89, which are necessary for displaying a cruising distance (step S300). Then, the HVECU 70 calculates a display cruising distance Lex by subtracting from the cruising distance Lc a value obtained by subtracting the set-time travel distance Lset from the travel distance Lpre (step S310), displays the calculated display cruising distance Lex on the display device 92 (step S320), and ends this routine.

FIG. 7 is an explanatory diagram showing one example of the relationship for the same fuel quantity Qf between the magnitude of a use index IDX and both a cruising distance Lc and an EV-travelable distance that are displayed on the display device 92. When the use index IDX is large, the cruising distance coefficient kidx is set to the value 1.0, so that a value (600 km in the middle in the middle row in FIG. 7) obtained by multiplying the fuel quantity Qf by the fuel consumption coefficient kfe is displayed on the display device 92. As the EV-travelable distance, a value (20 km in the middle in the lower row in FIG. 7) obtained by multiplying a dischargeable electric energy, calculated from the state of charge SOC of the battery 50, by a travel distance per unit electric energy (electric power consumption) is displayed on the display device 92. On the other hand, when the use index IDX is small, since the cruising distance coefficient kidx is set to a value smaller than the value 1.0, the fuel quantity Qf is multiplied by not only the fuel consumption coefficient kfe, but also the cruising distance coefficient kidx smaller than the value 1.0, so that a small value (120 km at the right end in the middle row in FIG. 7) is displayed on the display device 92. As the EV-travelable distance, a value (20 km at the right end in the lower row in FIG. 7) that is equal to the value when the use index IDX is large is displayed on the display device 92. With this display, it is intended to urge the driver to use external charging.

Next, the fuel supply limiting routine of FIG. 5 will be described. This routine is repeatedly executed every predetermined time (e.g. every 10 seconds or every 20 seconds). When the fuel supply limiting routine is executed, the HVECU 70 first inputs a display cruising distance Lex. (step S400) and determines whether or not the input display cruising distance Lex has reached a value of 0 or less (step S410). When the display cruising distance Lex has not reached the value 0 or less, the HVECU 70 does nothing and ends this routine. On the other hand, when the display cruising distance Lex has reached the value 0 or less, the HVECU 70 closes the fuel supply valve 25*c* to stop fuel supply from the fuel tank 25 to the engine 22 (step S420) and ends this routine. When the use index IDX is small, the fuel supply to the engine 22 is stopped even though the fuel quantity Qf has not reached the value 0, so that it is possible to strongly urge the driver to use external charging. It is also preferable to make an announcement with character display or voice, such as "It will soon be impossible to travel. Use external charging, please.", before stopping the fuel supply to the engine 22 by the fuel supply valve 25*c*.

Figure 8:
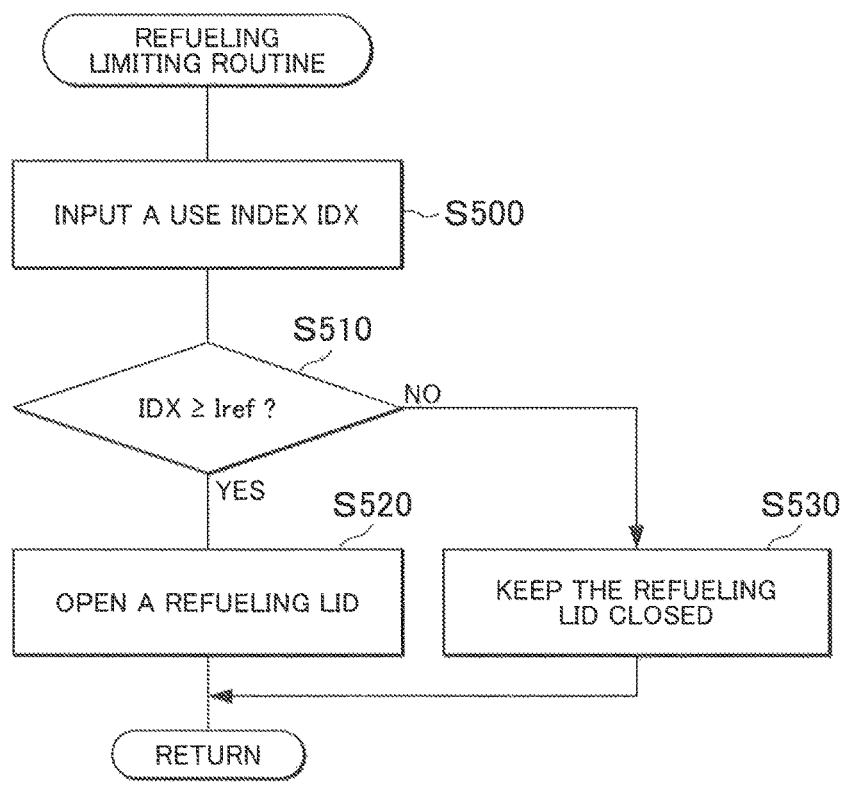
FIG. 8 is a flowchart showing one example of a refueling limiting routine that is executed by the HVECU.

In the hybrid vehicle 20 of the embodiment, the limitation of refueling to the fuel tank 25 is also performed based on the use index IDX. FIG. 8 is a flowchart showing one example of a refueling limiting routine that is executed by the HVECU 70. This routine is executed when a switch (not shown) for opening the refueling lid 25*b* is pushed. When the refueling limiting routine is executed, the HVECU 70 first inputs a use index IDX (step S500) and compares the use index IDX with a threshold value Iref (step S510). The threshold value Iref is determined in advance as a threshold value for determining that the degree of use of external charging is low. When the use index IDX is greater than or equal to the threshold value Iref, the HVECU 70 determines that the degree of use of external charging cannot be said to be low, so as to open the refueling lid 25*b* without performing the refueling limitation (step S520) and ends this routine. On the other hand, when the use index IDX is less than the threshold value Iref, the HVECU 70 determines that the degree of use of external charging is low, so as to keep the refueling lid 25*b* closed as the refueling limitation (step S530) and ends this routine. By this control, when the use index IDX is small, it is possible to strongly urge the driver to use external charging. When this refueling limitation is performed, it is also preferable to make an announcement with character display or voice, such as "Use external charging, please.".

In the hybrid vehicle 20 of the embodiment described above, when the use index IDX indicating the degree of use of external charging is small, the cruising distance Lc is calculated by multiplying the fuel quantity Qf by the cruising distance coefficient kidx smaller than the value 1 and the fuel consumption coefficient kfe. Then, the display cruising distance Lex is calculated by subtracting from the cruising distance Lc a value obtained by subtracting the set-time travel distance Lset, obtained when the cruising distance Lc is calculated, from the travel distance Lpre, and the calculated display cruising distance Lex is displayed on the display device 92 attached to the instrument panel in front of the driver's seat. Consequently, when the use index IDX is small, the display cruising distance Lex based on the cruising distance Lc smaller than a cruising distance that is actually calculated from the fuel quantity Qf in the fuel tank 25 is displayed, so that it is possible to urge the driver to use external charging. Further, since the smaller cruising distance coefficient kidx is set as the use index IDX gets smaller, the smaller cruising distance Lc is calculated as the use index IDX gets smaller, and the display cruising distance Lex based on this cruising distance Lc is displayed on the display device 92. Therefore, it is possible to urge the driver to use external charging more strongly as the use index IDX gets smaller.

In the hybrid vehicle 20 of the embodiment, when the use index IDX is small, even though the fuel quantity Qf has not reached the value 0, the display cruising distance Lex reaches the value 0 or less due to travel, so that the fuel supply valve 25*c* is closed to stop fuel supply from the fuel tank 25 to the engine 22. Consequently, it is possible to strongly urge the driver to use external charging.

In the hybrid vehicle 20 of the embodiment, when the use index IDX is less than the threshold value Iref, even if the switch for opening the refueling lid 25*b* is operated, the refueling lid 25*b* is kept closed. Consequently, it is possible to strongly urge the driver to use external charging.

In the hybrid vehicle 20 of the embodiment, when the use index IDX is small, the small cruising distance Lc is calculated compared to when the use index IDX is large, and the display cruising distance Lex based on this cruising distance Lc is displayed. Further, when the display cruising distance Lex has reached the value 0 or less due to travel, the fuel supply from the fuel tank 25 to the engine 22 is stopped. Further, when the use index IDX is less than the threshold value Iref even if the switch for opening the refueling lid 25*b* is operated, the refueling lid 25*b* is kept closed. However, it may be configured that even when the display cruising distance Lex has reached the value 0 or less due to travel, the fuel supply from the fuel tank 25 to the engine 22 is not stopped. Further, it may be configured that even when the use index IDX is less than the threshold value Iref, the refueling lid 25*b* is opened.

In the hybrid vehicle 20 of the embodiment, the cruising distance coefficient kidx smaller than the value 1 is set so as to have a smaller value as the use index IDX gets smaller, and the cruising distance Lc is calculated by multiplying the fuel quantity Qf by the cruising distance coefficient kidx and the fuel consumption coefficient kfe. However, since it is satisfactory if the cruising distance Lc is set to be small when the use index IDX is small compared to when the use index IDX is large, it may be configured that when the use index IDX is less than or equal to a predetermined value, the cruising distance Lc is calculated by multiplying the product of the fuel consumption coefficient kfe and the fuel quantity Qf by a predetermined coefficient smaller than the value 1, such as 0.3 or 0.5. Alternatively, it may be configured that when the use index IDX is less than or equal to a predetermined value, the cruising distance Le is calculated by subtracting a predetermined distance from a cruising distance calculated when the use index IDX is large.

Figure 9:
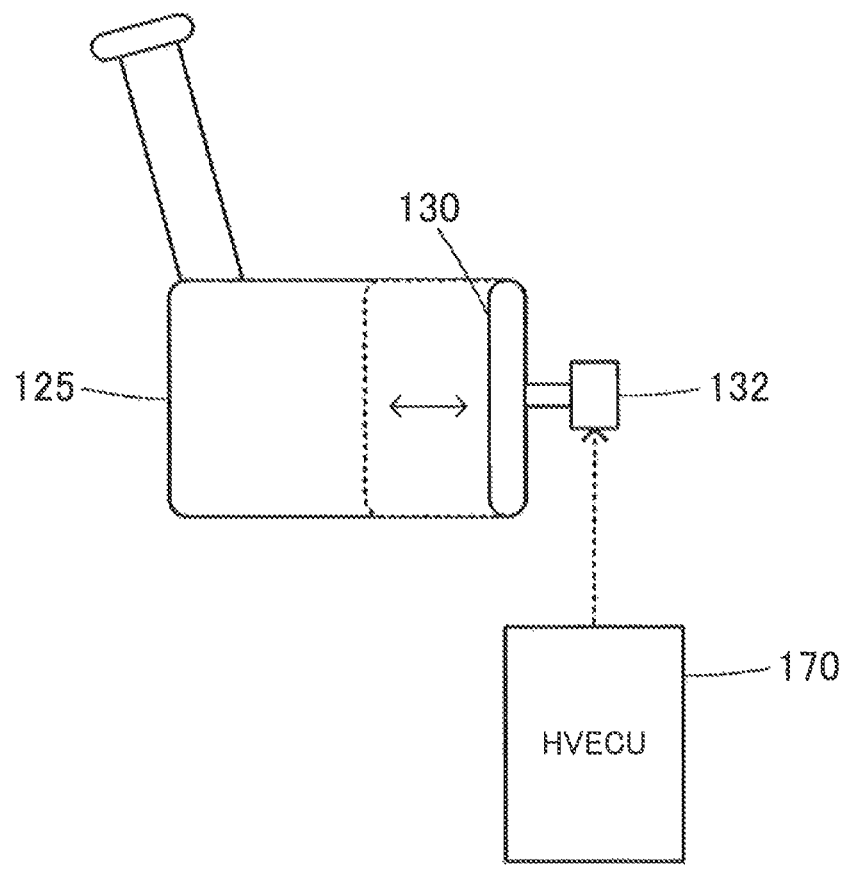
FIG. 9 is an explanatory diagram showing a portion related to a fuel tank and an HVECU according to a modification.
Figure 10:
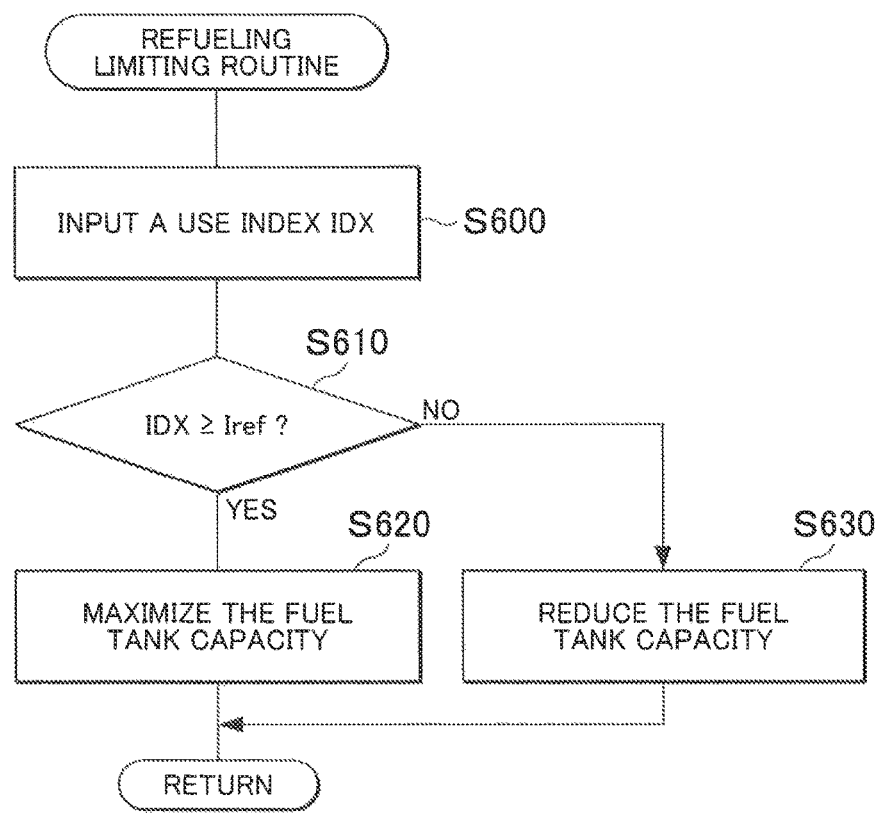
FIG. 10 is a flowchart showing one example of a refueling limiting routine according to the modification.

In the hybrid vehicle 20 of the embodiment, as the refueling limitation when the use index IDX is less than the threshold value Iref, the refueling lid 25*b* is kept closed. However, in the case where a fuel tank that can change the tank capacity is provided, it may be configured that the tank capacity is reduced as the refueling limitation when the use index IDX is less than the threshold value Iref. In a hybrid vehicle having such a configuration, FIG. 9 shows only a portion related to a fuel tank 125 capable of changing the tank capacity and an HVECU 170, and FIG. 10 shows one example of a refueling limiting routine in this case. As shown in FIG. 9, the tank capacity of the fuel tank 125 can be changed by changing the position of a movable wall 130 using an actuator 132, and a drive signal is output to the actuator 132 from an output port of the HVECU 170. In the refueling limiting routine of FIG. 10 the HVECU 170 first inputs a use index IDX (step S600) and compares the use index IDX with a threshold value Iref (step S610). When the use index IDX is greater than or equal to the threshold value Iref, the HVECU 170 drives the actuator 132 so as to maximize the tank capacity of the fuel tank 125 (step S620) and ends this routine. On the other hand, when the use index IDX is less than the threshold value Iref, the HVECU 170 drives the actuator 132 so as to reduce the tank capacity of the fuel tank 125 (step S630) and ends this routine. The degree of reducing the tank capacity of the fuel tank 125 may be set to a predetermined degree or may be set such that the smaller the use index IDX, the smaller the tank capacity. By this control, when the use index IDX is small, even if refueled, the cruising distance Lc and the display cruising distance Lex become further smaller, so that it is possible to strongly urge a driver to use external charging.

Figure 11:
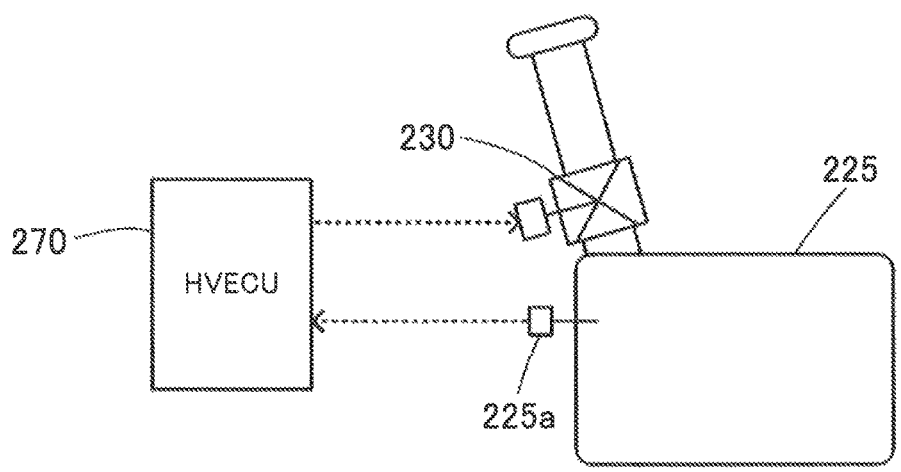
FIG. 11 is an explanatory diagram showing a portion related to a fuel tank and an HVECU according to a modification.
Figure 12:
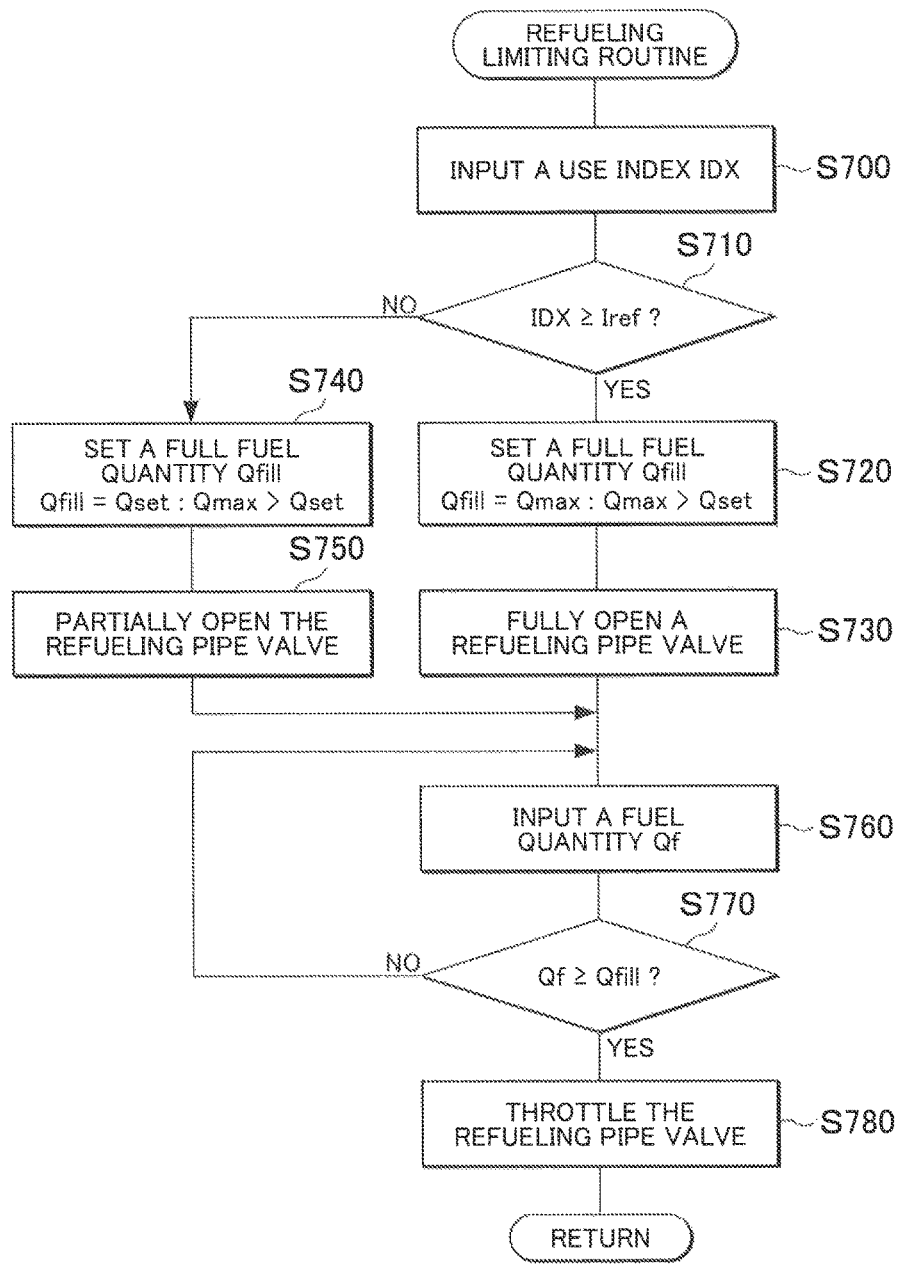
FIG. 12 is a flowchart showing one example of a refueling limiting routine according to the modification.

Alternatively, as the refueling limitation, it may be configured to slow down the refueling speed or it may be configured that even when the fuel quantity Qf of a fuel tank is not 100%, a refueling device refueling a vehicle is forced to determine that the fuel tank is full, and stops the refueling. In a hybrid vehicle having such a configuration, FIG. 11 shows only a portion related to a fuel tank 225 and an HVECU 270, and FIG. 12 shows one example of a refueling limiting routine in this case. As shown in FIG. 11, an electrically-operated refueling pipe valve 230 capable of adjusting its opening degree is attached to a refueling pipe of the fuel tank 225, and a drive signal is output to the refueling pipe valve 230 from an output port of the HVECU 270. In the refueling limiting routine of FIG. 12, the HVECU 270 first inputs a use index IDX (step S700) and compares the use index IDX with a threshold value Iref (step S710). When the use index IDX is greater than or equal to the threshold value Iref, the HVECU 270 sets a full fuel quantity Qfill to a tank capacity Qmax of the fuel tank 225 (step S720) and fully opens the refueling pipe valve 230 (step S730). On the other hand, when the use index IDX is less than the threshold value Iref, the HVECU 270 sets the full fuel quantity Qfill to a capacity Qset smaller than the tank capacity Qmax (step S740) and partially opens the refueling pipe valve 230 (step S750). For example, the capacity Qset may be set to a capacity of 30% or 20% of the tank capacity Qmax or may be set such that the smaller the use index IDX, the smaller the capacity. For example, the degree of partial opening of the refueling pipe valve 230 may be set to an opening area of 30% or 20% of the full opening or may be set such that the smaller the use index IDX, the smaller the opening degree. In this way, by partially opening the refueling pipe valve 230 when the use index IDX is less than the threshold value Iref, it is possible to slow down the refueling speed. When the refueling speed is slow, it takes time to refuel the fuel tank 225, so that it is possible to strongly urge a driver to use external charging. Then, waiting for the fuel quantity Qf from a fuel gauge 225*a* to reach the set full fuel quantity Qfill or more (steps S760 and S770), the HVECU 270 throttles the refueling pipe valve 230 (step S780) and ends this routine. Since the full fuel quantity Qfill is set to the capacity Qset that is smaller than the tank capacity Qmax when the use index IDX is less than the threshold value Iref, the refueling pipe valve 230 is throttled before the fuel tank 225 becomes full. When the refueling pipe valve 230 is throttled, the overflow of fuel is transmitted to a refueling nozzle of the refueling device refueling the vehicle, so that the refueling device determines that the fuel tank is full as in the case of the fuel tank being actually full, and stops the refueling from the refueling nozzle. In this way, since the refueling is stopped before the fuel tank 225 becomes full, the cruising distance Lc and the display cruising distance Lex become further smaller. As a result, it is possible to strongly urge the driver to use external charging. In this modification, it is configured that the refueling pipe valve 230 is throttled when the fuel quantity Qf has reached the full fuel quantity Qfill or more, but it may alternatively be configured that the refueling pipe valve 230 is closed instead of being throttled. In this modification, it is configured that, as the refueling limitation, the refueling speed is slowed down and, in addition, even when the fuel quantity Qf of the the fuel tank is not 100%, the refueling device refueling the vehicle is forced to determine that the fuel tank is full, and stops the refueling. Alternatively, as the refueling limitation, it may only be configured that the refueling speed is slowed down or it may only be configured that even when the fuel quantity Qf of the fuel tank is not 100%, the refueling device refueling the vehicle is forced to determine that the fuel tank is full, and stops the refueling.

Figure 13:
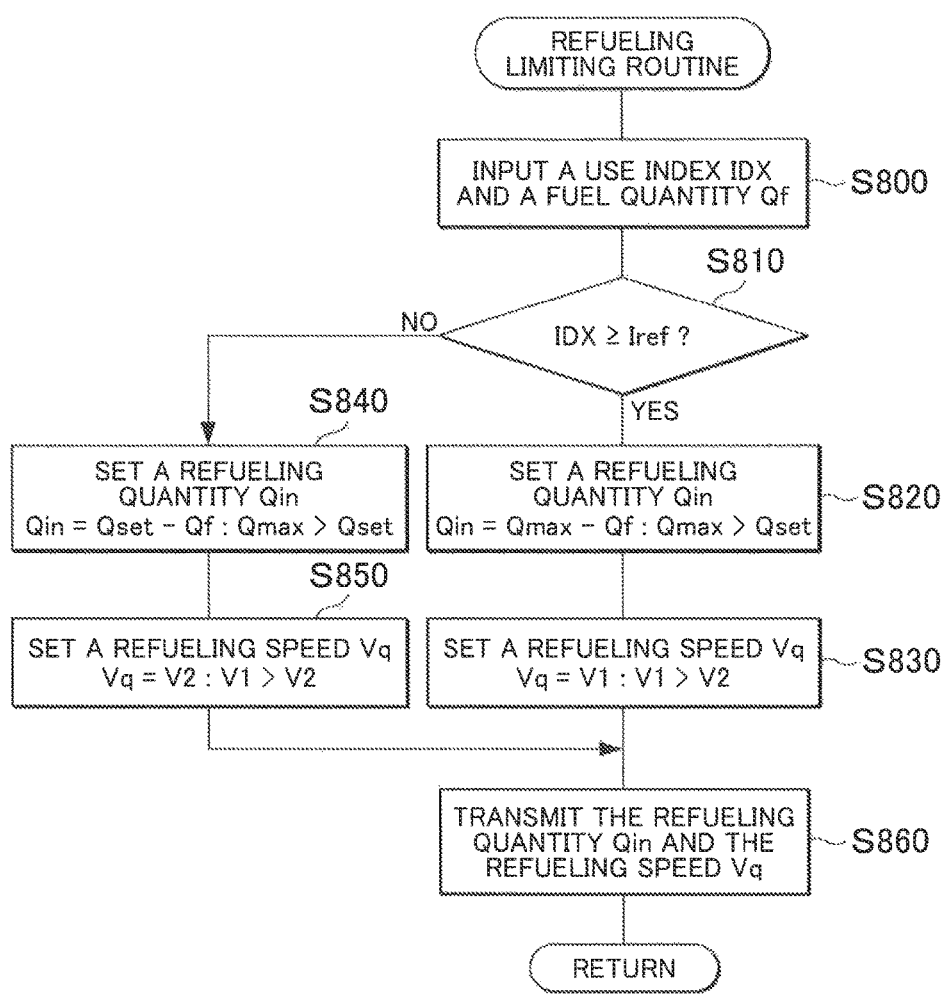
FIG. 13 is a flowchart showing one example of a refueling limiting routine according to a modification.

Further, assuming a refueling device that has a communication function and is configured to carry out refueling based on a refueling quantity Qin and a refueling speed Vq that are transmitted from a vehicle, it may be configured that, as the refueling limitation, a refueling quantity Qin smaller than a refueling quantity that makes a fuel tank full is transmitted to the refueling device for refueling or a refueling speed Vq that is slower than a normal refueling speed is transmitted to the refueling device for refueling. FIG. 13 shows one example of a refueling limiting routine in this case. In the refueling limiting routine of FIG. 13, the HVECU 70 first inputs a use index IDX and a fuel quantity Qf from the fuel gauge 25a (step S800) and compares the use index IDX with a threshold value Iref (step S810). When the use index IDX is greater than or equal to the threshold value Iref, the HVECU 70 sets as a refueling quantity Qin a value that is obtained by subtracting the fuel quantity Qf from the tank capacity Qmax of the fuel tank 25 (step S820), and sets a normal speed V1 as a refueling speed Vq (step S830). On the other hand, when the use index IDX is less than the threshold value Iref, the HVECU 70 sets the refueling quantity Qin to a value that is obtained by subtracting the fuel quantity Qf from a capacity Qset smaller than the tank capacity Qmax (step S840) and sets the refueling speed Vq to a speed V2 that is smaller than the normal speed V1 (step S850). Then, the HVECU 70 transmits the set refueling quantity Qin and the set refueling speed Vq to the refueling device (step S860) and ends this routine. The refueling device having received the refueling quantity Qin and the refueling speed Niq starts refueling at the refueling speed Vq in response to an operation of a refueling nozzle or the like and stops the refueling when the refueled quantity has reached the refueling quantity Qin. When the use index IDX is less than the threshold value Iref, since the refueling quantity Qin is set to the value that is obtained by subtracting the fuel quantity Qf from the capacity Qset smaller than the tank capacity Qmax, the refueling is stopped before the fuel tank 25 becomes full. Therefore, even if refueled, the cruising distance Lc and the display cruising distance Lex become small compared to when the use index IDX is greater than or equal to the threshold value Iref. As a result, it is possible to strongly urge the driver to use external charging. Further, when the use index IDX is less than the threshold Value Iref, since the refueling speed Vq is set to the speed V2 that is smaller than the normal speed V1, the refueling speed is slowed down. When the refueling speed is slow, it takes time to refuel the fuel tank 25, so that it is possible to strongly urge the driver to use external charging.

The hybrid vehicle 20 of the embodiment is provided with the charger 60 that charges the battery 50 by connecting the power plug 61 to the external power source 69, but may alternatively be provided with a charger that charges the battery 50 by receiving electric power from the external power source 69 in a non-contact manner.

Figure 14:
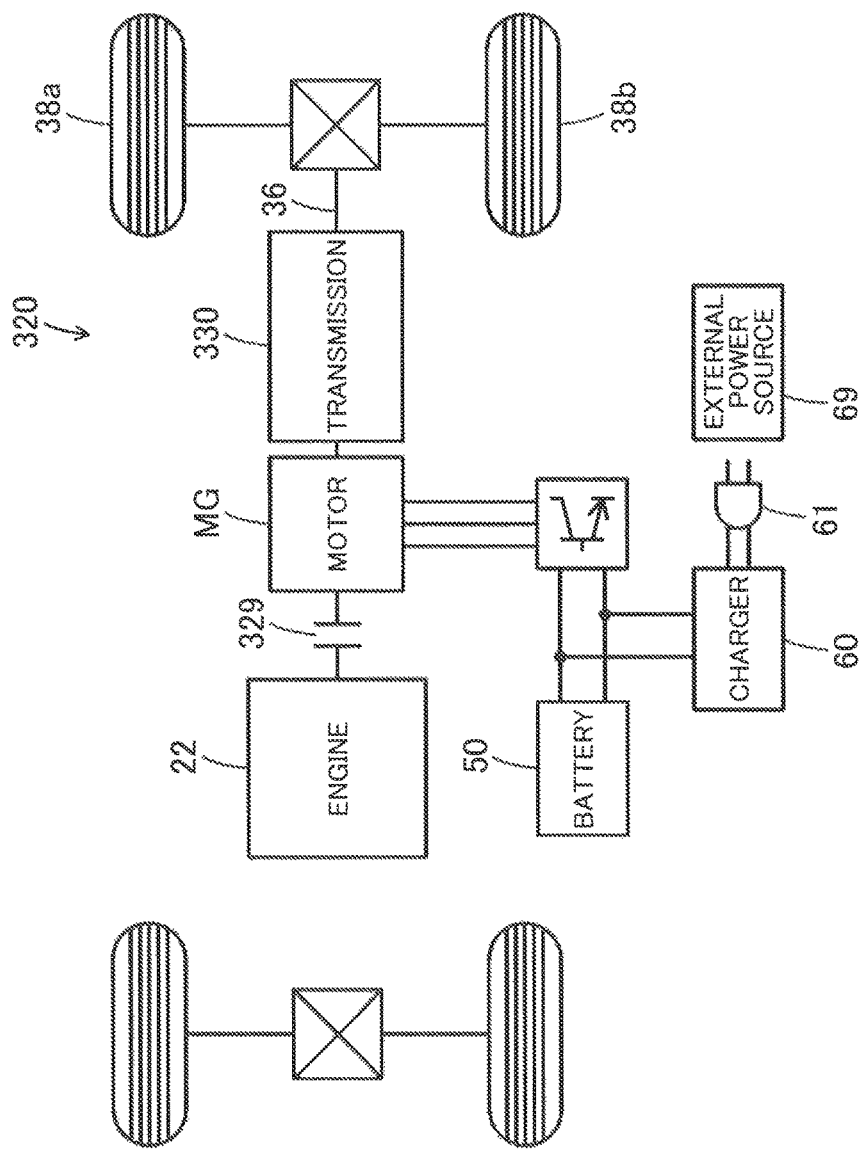
FIG. 14 is a configuration diagram schematically showing the configuration of a hybrid vehicle according to a modification.

In the hybrid vehicle 20 of the embodiment, the engine 22, the motor MG1, and the drive shaft 36 are connected to the planetary gear 30, and the motor MG2 is connected to the drive shaft 36. However, as shown in a hybrid vehicle 320 of a modification of FIG. 14 by way of example, it may be configured that a motor MG is connected via a transmission 330 to a drive shaft 36 connected to drive wheels 38a and 38b and that an engine 22 is connected to a rotary shaft of the motor MG via a clutch 329, and it may be configured that the power from the engine 22 is output to the drive shaft 36 via the rotary shaft of the motor MG and the transmission 330 and that the power from the motor MG is output to the drive shaft 36 via the transmission 330. Alternatively, use may be made of a configuration of a so-called series hybrid vehicle. That is any configuration may be employed as long as it is a hybrid vehicle including an engine, a motor, a battery, and a charger that is connected to an external power source to charge the battery.

The correspondence relationship between the main components of the embodiment and the main components of the disclosure described in the column of SUMMARY will be described. In the embodiment, the engine 22 corresponds to an "engine", the fuel tank 25 corresponds to a "fuel tank", the motor MG2 corresponds to a "motor", the battery 50 corresponds to a "battery", the charger 60 corresponds to a "charger", and the HVECU 70 that executes the routines of FIGS. 2 to 5 and 8 corresponds to an "electronic control unit".

Since the embodiment is one example for specifically explaining a mode for carrying out the disclosure described in the column of SUMMARY, the correspondence relationship between the main components of the embodiment and the main components of the disclosure described in the column of SUMMARY does not limit the components of the disclosure described in the column of SUMMARY. That is, the disclosure described in the column of SUMMARY should be interpreted based on the description in the column of SUMMARY, and the embodiment is merely one specific example of the disclosure described in the column of SUMMARY.

While the mode for carrying out the disclosure has been described with reference to the embodiment, the disclosure is by no means limited to such an embodiment and can of course be carried out in various modes within a range not departing from the gist of the disclosure.

The disclosure is applicable to the manufacturing industry of hybrid vehicles, and so on.

What is claimed is:

1. A hybrid vehicle comprising:
   an engine;
   a fuel tank configured to supply fuel to the engine;
   a motor;
   a battery configured to supply electric power to the motor;
   a charger configured to carry out external charging that charges the battery using an external power source;
   an electronic control unit configured to adjust a cruising distance, the cruising distance being a distance that the hybrid vehicle can travel using the fuel, such that, when a use index indicating a degree of use of the external charging in a predetermined time period is lower than a threshold value, the cruising distance is lower than when the use index is greater than or equal to the threshold value; and
   a display device, wherein
   the electronic control unit is configured to control the display device such that the display device displays a distance that is lower than a travelable distance calculated from a fuel quantity in the fuel tank, as the cruising distance.

2. The hybrid vehicle according to claim 1, wherein
   the electronic control unit is configured to calculate the cruising distance by multiplying the travelable distance calculated from the fuel quantity in the fuel tank, by a coefficient that decreases as the use index decreases.

3. The hybrid vehicle according to claim 1, wherein
   the electronic control unit is configured to limit fuel supply from the fuel tank to the engine when the cruising distance has been traveled.

4. A hybrid vehicle comprising:
   an engine;
   a fuel tank configured to supply fuel to the engine;
   a motor;

a battery configured to supply electric power to the motor;
a charger configured to carry out external charging that charges the battery using an external power source;
an electronic control unit configured to adjust a cruising distance, the cruising distance being a distance that the hybrid vehicle can travel using the fuel, such that, when a use index indicating a degree of use of the external charging in a predetermined time period is lower than a threshold value, the cruising distance is lower than when the use index is greater than or equal to the threshold value,
wherein the electronic control unit is configured to limit refueling to the fuel tank.

5. The hybrid vehicle according to claim 4, wherein the electronic control unit is configured to close a refueling port of the fuel tank.

6. The hybrid vehicle according to claim 4, wherein the electronic control unit is configured to cause a refueling device to stop refueling when a fuel quantity in the fuel tank is less than 100%.

7. The hybrid vehicle according to claim 4, wherein the fuel tank is configured such that a capacity of the fuel tank is variable, and the electronic control unit is configured to reduce the capacity of the fuel tank.

8. The hybrid vehicle according to claim 4, wherein the electronic control unit is configured to transmit, to a refueling device configured to carry out refueling in response to receipt of a required refueling quantity from the hybrid vehicle, a refueling quantity that is smaller than a refuelable quantity calculated from a fuel quantity in the fuel tank, as the required refueling quantity.

9. The hybrid vehicle according to claim 4, wherein the electronic control unit is configured to slow down a refueling speed by causing an opening area of a portion of a refueling pipe to be smaller than a normal area.

10. The hybrid vehicle according to claim 4, wherein the electronic control unit is configured to transmit a signal to a refueling device configured to be communicable and to be able to adjust a refueling speed such that the refueling device carries out refueling at a refueling speed slower than a normal refueling speed.

* * * * *